(12) United States Patent
Gonzales

(10) Patent No.: US 8,506,283 B1
(45) Date of Patent: Aug. 13, 2013

(54) TAMALE MAKER

(76) Inventor: Edward Ray Gonzales, Alpine, CA (US)

( * ) Notice: Subject to any disclaimer, the term of this patent is extended or adjusted under 35 U.S.C. 154(b) by 0 days.

(21) Appl. No.: 13/413,600

(22) Filed: Mar. 6, 2012

(51) Int. Cl.
*A21C 5/08* (2006.01)
*B30B 1/00* (2006.01)
*B30B 15/06* (2006.01)

(52) U.S. Cl.
USPC ........... 425/401; 425/112; 425/193; 425/283; 425/352; 425/398; 425/412; 425/420; 425/441; 425/812; 425/89; 249/122; 249/141; 249/160; 249/173; 426/284; 426/499; 426/514

(58) Field of Classification Search
CPC .... A21C 11/00; A21C 11/002; A21C 11/006; A22C 7/0023; A23G 3/0236; A23G 3/0242; A23G 3/0247; A23G 3/0263
USPC ................ 425/191, 227, 239, 240, 256, 287, 425/288, 291, 292, 344, 346, 355, 363, 376.1, 425/380, 394, 398, 399, 400, 401, 406, 412, 425/416, 438, 442, 461, 502, 544, 112, 126.1, 425/128, 182, 188, 193, 195, 282, 283, 345, 425/349, 348 S, 352, 353, 354, 408, 410, 425/411, 414, 415, 420, 441, 443, 451.9, 425/812, 89; 426/282, 283, 284, 512, 514, 426/516, 518, 51, 499; 249/63, 122, 141, 249/160, 173
See application file for complete search history.

(56) References Cited

U.S. PATENT DOCUMENTS

| | | | | |
|---|---|---|---|---|
| 1,871,837 A | | 8/1932 | Brown | |
| 2,134,862 A | * | 11/1938 | Dunnam | 53/526 |
| 2,303,351 A | * | 12/1942 | Gage et al. | 222/142 |
| 2,371,225 A | * | 3/1945 | Curry | 425/133.1 |
| 2,596,388 A | * | 5/1952 | Elvis | 425/292 |
| 2,619,050 A | * | 11/1952 | Forbes | 425/410 |
| 2,694,641 A | * | 11/1954 | Marshall et al. | 426/8 |
| 3,155,055 A | * | 11/1964 | Nishkian | 72/334 |
| 3,232,246 A | * | 2/1966 | Nishkian | 425/398 |
| 3,538,859 A | * | 11/1970 | Rudolph et al. | 426/391 |
| 3,679,167 A | * | 7/1972 | Jupiter et al. | 249/173 |
| 4,015,518 A | | 4/1977 | Roth et al. | |
| 4,078,876 A | * | 3/1978 | Yesulis | 425/458 |
| 4,114,781 A | * | 9/1978 | Doyel | 222/326 |
| 4,233,016 A | * | 11/1980 | Chin et al. | 425/288 |
| D257,608 S | | 12/1980 | Villalpando | |
| 4,371,327 A | * | 2/1983 | Fievez | 425/218 |
| 4,391,575 A | * | 7/1983 | Osrow | 425/190 |

(Continued)

FOREIGN PATENT DOCUMENTS

DE 4001082 C1 * 2/1991

*Primary Examiner* — Seyed Masoud Malekzadeh
(74) *Attorney, Agent, or Firm* — Palomar Patent; Calif Tervo

(57) ABSTRACT

A device, such as a tamale maker, for inserting edible filling into dough, generally includes a lower assembly and an upper assembly. The lower assembly includes an elongate cylindrical mold sleeve comprised of a plurality of separable longitudinal segments around a central cavity and a base for receiving the mold sleeve so as to define a container for receiving dough. The upper assembly comes in two forms, one having a plunger for use with masa dough having a firm consistency so it can be formed into a self-supporting shape, and one having tines for inserting a solid or frozen filling into flowable or soft masa dough. The tamale is removed from the container by separating one or more sleeve segments of the container to expose the tamale.

8 Claims, 2 Drawing Sheets

(56) References Cited

U.S. PATENT DOCUMENTS

| | | | |
|---|---|---|---|
| 4,438,683 A * | 3/1984 | Bartfield | 99/330 |
| 4,498,377 A | 2/1985 | Smith | |
| 4,579,745 A * | 4/1986 | Mei Sue | 426/512 |
| 4,687,670 A | 8/1987 | Rodriguez | |
| 5,074,778 A * | 12/1991 | Betts et al. | 425/394 |
| 5,176,922 A * | 1/1993 | Balsano et al. | 425/89 |
| 5,198,239 A | 3/1993 | Beavers | |
| 5,540,140 A | 7/1996 | Rubio et al. | |
| 5,558,892 A * | 9/1996 | Pelka et al. | 426/283 |
| 5,573,788 A * | 11/1996 | Atwood | 425/238 |
| 5,658,608 A * | 8/1997 | Klefbeck | 426/512 |
| 5,667,821 A | 9/1997 | Castaneda | |
| 5,753,292 A * | 5/1998 | Haas | 426/523 |
| 6,067,897 A * | 5/2000 | Grieco | 99/353 |
| 6,242,027 B1 * | 6/2001 | Grieco | 426/502 |
| 6,701,828 B1 * | 3/2004 | Burns et al. | 99/450.2 |
| 7,160,098 B2 * | 1/2007 | Ingles | 425/318 |
| 7,841,848 B2 * | 11/2010 | Tatham | 425/188 |
| 2007/0034094 A1 * | 2/2007 | Tatham | 99/450.2 |
| 2007/0172559 A1 * | 7/2007 | Capodieci | 426/238 |
| 2010/0107900 A1 | 5/2010 | Hanson | |

* cited by examiner

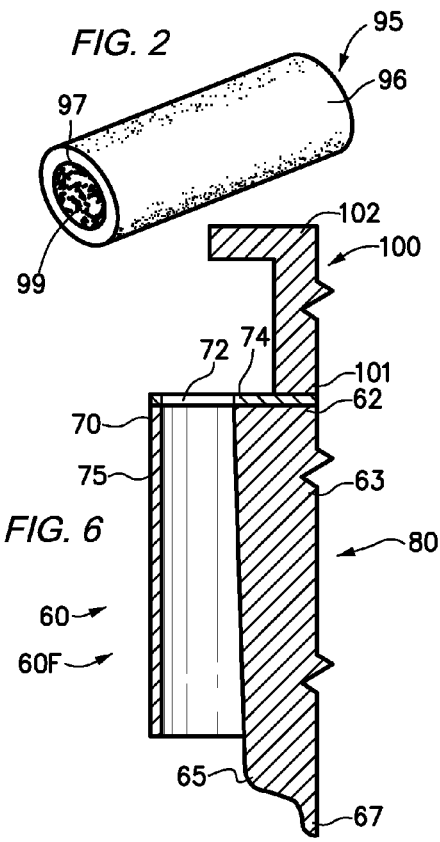

TAMALE MAKER

FIELD OF THE INVENTION

This invention relates in general to a device for inserting edible filling into dough and more specifically involves a tamale making device for home use.

BACKGROUND OF THE INVENTION

The traditional tamale includes a tube of masa dough surrounding a filling. Making tamales is a very time consuming process. Because of this, although a great many people enjoy eating tamales, they are often not served at home because of time constraints. Another problem with home made tamales is their inconsistency. Typically a rectangle of masa dough one-quarter to one-half inch thick is spread by hand on a wrapper, filling is placed down the center line of the dough, and the dough is rolled into a tube over the filling. Because it is made by hand, the thickness of the dough can vary, the amount of filling can vary, and the amount of filling and dough along the length can vary.

There are many commercial tamale makers available that can reduce the time for making each tamale and that can produce consistent tamales. However, these makers are specifically designed for making large batches of tamales and use an extrusion process. Consequently, the devices are large, expensive, complex, and would take too long to clean for home use.

Therefore, there has been a need for a tamale maker for home use that speeds up the process and makes consistent tamales.

SUMMARY OF THE INVENTION

The invention is a device for inserting edible filling into dough, such as a tamale maker, preferably for use with a bottom release sheet and with a side release sheet having a top edge. The tamale maker generally includes a lower assembly and an upper assembly. The lower assembly includes an elongate cylindrical mold sleeve comprised of a plurality of separable longitudinal segments around a central cavity and a base including retaining means for retaining the mold sleeve to the base so as to define a container for receiving masa dough and a surface for holding the base release sheet.

The mold sleeve includes an outer face, an inner face for receiving the side release sheet, and an upper end including an internal lip adapted for retaining the side release sheet in the cavity. The base surface may include a vent including a vent orifice under the base sheet and a duct in the base providing ambient air to the vent orifice.

The upper assembly includes a disk, filling centering means projecting downward from the disk for insertion into the central cavity for centering tamale filling in the central cavity, and cooperating centering means between the disk and the lower assembly for centering the filing centering means in the central cavity of the mold sleeve during insertion. An exemplary cooperating centering means includes a guide, such as a guide sleeve, projecting downward from the disk for contacting the outer face of the mold sleeve.

The upper assembly comes in two forms, one for use with masa dough having a firm consistency so it can be formed into a self-supporting shape, and one for use with flowable or soft masa dough.

For the firm masa dough, the filling centering means includes a handle connected to the disk for gripping by a user and a plunger connected to the disk and projecting downward therefrom and including an elongate cylinder and a punch on the lower end of the cylinder. The cylinder is adapted for plunging into the container of masa dough so as to form the filling receiving cylinder in the masa dough and to force the masa dough into a cylindrical shape around the plunger cylinder. The punch punches through the base sheet and enters the vent orifice for relieving suction upon removal of the plunger.

For flowable masa dough, the filling centering means includes a central opening in the disk for insertion of a cylinder of solid filling, such as frozen filling, and, in the exemplary embodiment, includes a downward projection defining a central space for receiving filling. The downward projection may be a plurality of spaced tines or a cylinder. The tamale masa is cooled by action of the frozen filling making the flowable masa firm before removal from the container.

The tamale is removed from the container by separating one or more sleeve segments of the container to expose the tamale.

Other features and many attendant advantages of the invention will become more apparent upon a reading of the following detailed description together with the drawings wherein like reference numerals refer to like parts throughout.

BRIEF DESCRIPTION OF THE DRAWINGS

FIG. 2 is a perspective view of tamale produced by the maker.

FIG. 3 is a vertical cross-sectional view of a sleeve segment the mold sleeve of FIG. 1.

FIG. 4 is a horizontal sectional view taken on line 4-4 of FIG. 1.

FIG. 5 is a vertical, half cross-sectional view of the base of FIG. 1.

FIG. 6 is a vertical half cross-sectional view of the upper assembly of FIG. 1.

FIG. 7 is a horizontal sectional view of the upper assembly taken on 7-7 of FIG. 1.

FIG. 8 is a perspective view of an alternative upper assembly.

FIG. 9 is a horizontal sectional view taken on line 9-9 of FIG. 8.

DETAILED DESCRIPTION OF THE INVENTION

Figure 1:
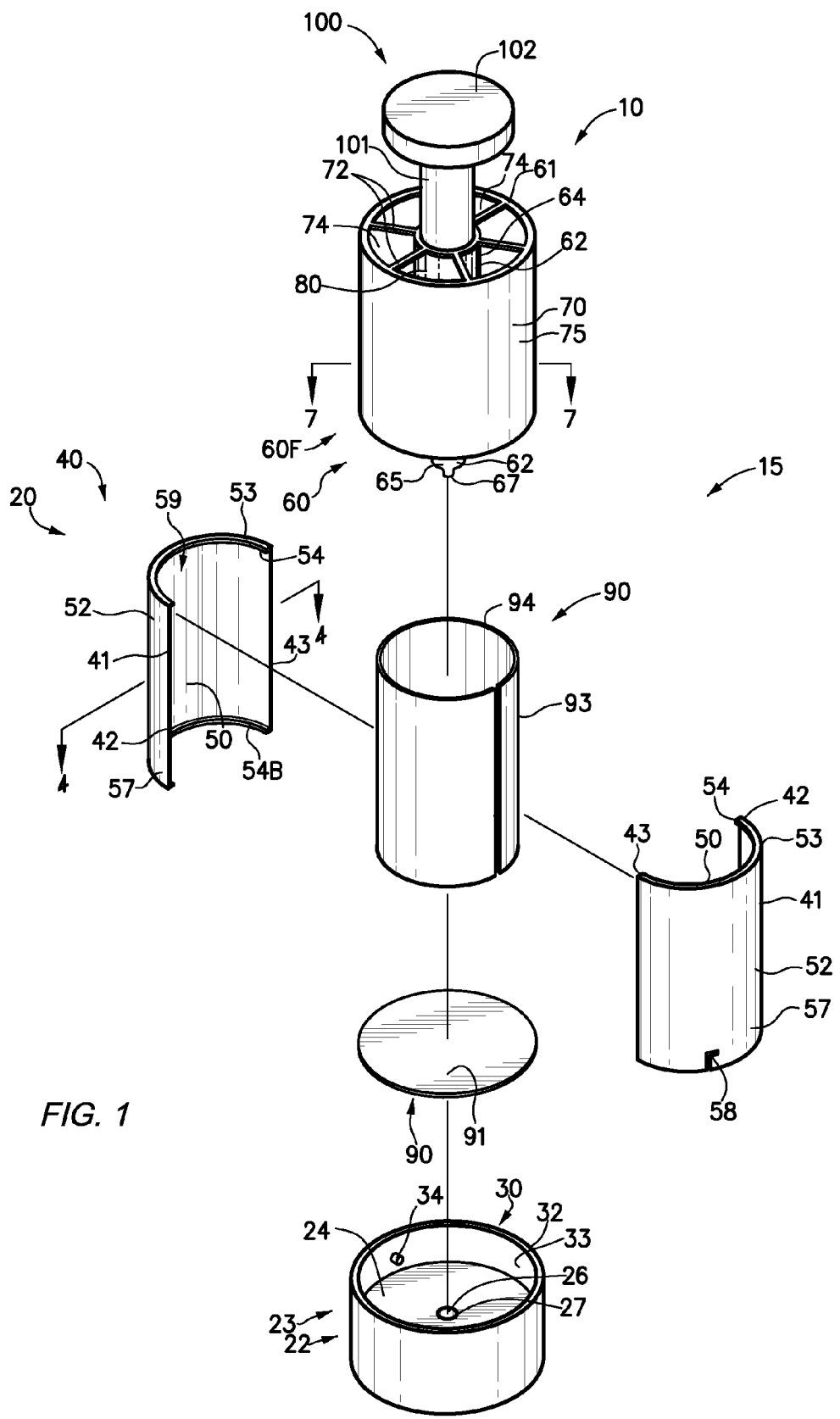
FIG. 1 is an exploded perspective view of exemplary embodiment of the tamale maker of the invention.

With reference first to FIGS. 1 and 2 of the drawing, FIG. 1 is an exploded perspective view of an exemplary embodiment of the tamale maker 10 of the invention, and FIG. 2 is a perspective view of a tamale 95 produced by maker 10. Tamale 95 includes a cylindrical tube of masa dough 96 holding a cylinder of filling 99.

Maker 10 generally comprises a lower assembly 20 and an upper assembly 60, such as upper assembly 60F for use with firm masa dough 96. Lower assembly 20 includes a base 22 and a cylindrical mold sleeve 40 having a central cavity 59. Disposable release sheets 90 for masa dough 96 include a base sheet 91 and a liner or side sheet 93. Upper assembly 60F generally includes a disk 61, filling centering means 80, such as plunger 62, projecting downward from disk 61 for insertion into central cavity 59 for centering tamale filling 99 in central cavity 59, a handle 100 attached to disk 61 and a cooperating centering means 70, such as centering sleeve 75, for centering plunger 62 in mold sleeve 40. Handle 100 includes a stalk 101 attached to disk 61 and projecting upward and grip 102 attached to upper end of stalk 101.

Release sheets 90 are placed in lower assembly 20 to prevent masa dough 96 from sticking to lower assembly 20. Release sheets 90 are typically removed from lower assembly 20 with tamale 95, then removed from tamale 95 and discarded. Base sheet 91 is placed in base 22, and side sheet 93 is placed to line mold sleeve 40. Preferably, release sheets 90 are parchment paper, but other materials well known in the art will work. A flat sheet of parchment paper, cut and shaped as in FIG. 1 to fit in mold sleeve 40, is sufficiently resilient so as to conform to the inner face 50 of mold sleeve 40. Mold sleeve 40 is comprised of a plurality of longitudinal segments 41, such as the two segments 41 shown, that fit together to form an elongate cylindrical tube having a longitudinal axis and encompassing a central cavity 59.

FIG. 3 is a vertical cross-sectional view of sleeve segment 41 of mold sleeve 40 of FIG. 1 also including a cross-section of side sheet 93 in position. FIG. 4 is a horizontal sectional view of sleeve segment 41 and side sheet 93 taken on line 4-4 of FIG. 1. Mold segments 41 include cooperating means, such as a tongue 42 and groove 43, on their adjoining edges to aid in holding mold segments 41 together as mold sleeve 40. Mold sleeve 40 includes an inner face 50, an outer face 52, an upper end 53, and a lower end 57. Upper end 53 includes means, such as internal lip 54, projecting slightly inward above inner face 50 for bearing against the top edge of side sheet 93 for blocking upward movement of side sheet 93 for retaining side sheet 93 in mold sleeve 40 upon withdrawal of plunger 62 from masa dough 96 in central cavity 59 as will be further explained later. Lower end 57 may includes connecting means, such as cooperating retention grooves 58 for connecting mold sleeve 40 to base 22. Other connecting means well known in the art, such as threads or detents, could be used.

Looking also at FIG. 5 in addition to FIG. 1, there is shown a vertical half cross-sectional view of base 22 of FIG. 1. Base 22 generally includes a top 23, a vent 26, and retaining means 30, such as collar 32 and studs 34, for retaining lower end 57 of mold sleeve 40 to base 22 so as to define a container for receiving dough. Top 23 includes a surface 24 for receiving base sheet 91. Vent 26 includes a vent orifice 27 in top surface 24 and a duct 28 in base 22 providing ambient air to vent orifice 27. Collar 32 includes an inner face 33 for receiving lower end 57 of mold sleeve 40 such that central cavity 59 is centered on vent orifice 27 and lower ends 57 of sleeve segments 41 are held together. Studs 34 in collar 32 cooperate in a manner well known with retention grooves 58 in mold sleeve 40 for retaining mold sleeve 40 in collar 32. Although a collar 32 with studs 34 is shown as retaining means 30, other types of retaining means 30 could be used, such as detents, slots or threads, or one or more sleeve segments 41 may be permanently attached to base 22, such as with a hinge (not shown). Mold sleeve 40 must be retained to base 22 or mold sleeve 40 will rise upon insertion of a plunger 62 or solid filling 99 into dough 96.

When upper assembly 40 is attached to lower assembly 20, a container 15 for receiving masa dough is formed. Preferably, container 15 is lined on the bottom with base sheet 91 and on the sides with side sheet 94.

Looking also at FIGS. 6 and 7 in addition to FIG. 1, there is shown in FIG. 6 a vertical half cross-sectional view of upper assembly 60F of FIG. 1 and, in FIG. 7, a horizontal sectional view of upper assembly 60F taken on elevation 7-7 of FIG. 1.

Upper assembly 60F generally includes disk 61, filling centering means, such as a plunger 62, projecting downward from the center of disk 61, and a cooperating centering means 70, such as centering sleeve 75, for centering plunger 62 in central cavity 59 of mold sleeve 40. In the exemplary embodiment, upper end 64 of plunger cylinder 63 is attached to the center of disk 61.

The form and functioning of upper assembly 60F will be better understood by first explaining the process of making tamale 95 up to the point of using upper assembly 60F. Base release sheet 91 is placed on surface 24 of base 22. Mold sleeve 40 is assembled and positioned upright on base 22, such as by positioning mold sleeve 40 in collar 32 and fastening it in place with stud 34 in groove 58. Release side sheet 93 is placed inside assembled mold sleeve 40 against inner face 50 with its top edge 94 below lip 54.

A measured amount of firm masa dough 96 is inserted into central cavity 59. Masa dough 96 must have a firm consistency so it can be formed into a self-supporting shape. The preferred volume of masa dough 96 inserted is equal to the volume remaining in central cavity 59 of mold sleeve 40 after plunger 62 is inserted. Lower assembly 20 is now ready for engagement with upper assembly 60F to form the inserted masa dough 96 into a cylinder.

Upper assembly 60F, held by handle grip 102, is placed over lower assembly 20 and lowered such that plunger 62 is inserted into mold sleeve 40 containing masa dough 96 and plunger 62 penetrates masa dough 96 to form a central bore 97 in masa dough 96 for receiving filling 95. Plunger 62 includes an elongate cylinder 63 having a longitudinal axis and adapted for displacing a central volume of central cavity 59 such that displaced masa dough 96 fills the remainder of central cavity 59. Cylinder 63 is of length sufficient to touch or approach base release sheet 91. Preferably, cylinder 63 is tapered from upper end 64 to lower end 65 so as to be more easily released from masa dough 96 upon withdrawal of plunger 62 from masa dough 96 and from central cavity 59. Preferably, upon insertion and retraction of plunger 62, plunger 62 is rotated to relieve adhesion of dough to plunger 62.

A punch 67 on lower end 65 of plunger cylinder 63 is adapted for punching through base release sheet 91 and into vent orifice 27 such that, upon withdrawal of plunger 62 from central cavity 59, air can enter central cavity 59 below plunger 62 such that withdrawal of plunger 62 does not create a vacuum and pull masa dough 96 back into the central bore 97 displaced by plunger 62.

Cooperating centering means 70, such as centering sleeve 75 projecting downward from the periphery of disk 61, helps guide upper assembly 60F over lower assembly 20 for centering plunger 62 in central cavity 59 of mold sleeve 40 during plunging. Centering sleeve 75 slides along outer face 52 of mold sleeve 40 for centering plunger 62 in central cavity 59. Other cooperating centering means 70 could be used, such as guides projecting upward from base 22 for guiding flange 72 to align plunger 62. Openings 74 between radial spokes 72 of disk 61 provide a means for air and excess masa to escape from central cavity 59 upon insertion of plunger 62 therein. Centering sleeve 75 holds together the upper ends 53 of mold sleeve 40 so as to secure lower assembly 20 from the pressure created during insertion of plunger 62 or solid filling 99 into masa dough 96.

Upon withdrawal of plunger 62, masa dough 96 in central cavity 59 retains the central bore 97 made by plunger 62 so as to form a tube of masa dough 96. Filling 99 is placed in the central bore 97 of masa dough 96. Mold sleeve 40 is removed from base 22 and segments 41 separated to open mold sleeve 40. Tamale 95, as shown in FIG. 2, is removed from opened mold sleeve 40 for further processing, such as being wrapped, frozen, or cooked as desired. Alternatively, instead of placing filling 99 in central bore 97 of to tube of masa dough 96, the tube of masa dough 96 removed unfilled from mold sleeve 40 for freezing and for later filling.

FIGS. 8 and 9 illustrate an alternative upper assembly 60, such as upper assembly 60W for use with flowable or soft masa dough 96 and a cylinder of solid or frozen filling 99. FIG. 8 is a perspective view of alternate upper assembly 60W and FIG. 9 is a horizontal sectional view taken on line 9-9 of FIG. 8.

For use of upper assembly 60W, lower assembly 20 is assembled as described above with base release sheet 91 and side release sheet 93 therein. A measured amount of flowable masa dough 96 is squeezed from a bag or poured into central cavity 59 of mold sleeve 40. Upper assembly 60W includes a disk 61, filling centering means 80 for guiding filling 99 into the center of central cavity 59, and cooperating centering means 70, such as centering sleeve 75, for cooperating between upper assembly 60W and lower assembly 22 for positioning filling centering means 80 for guiding filling 99 into the center of central cavity 59 of mold sleeve 40 as described above.

Filling centering means 80 includes central opening 68 in disk 61 and filling receiving means, such as plurality of spaced tines 69, projecting downward from the rim of central opening 68 and defining a central space for receiving filling 99 though central opening 68. A cylinder or other shape could be used instead of tines 69 to define the central space for receiving filling 99.

Alternatively, instead of peripheral centering sleeve 75, shown, tines 69 could be shaped to also act as centering means 80 by having sufficient radial dimension such that their radially outward sides bear on inner face 50 of mold sleeve 40 so as to center the innermost portions of tines 69.

Tines 69 are inserted into the flowable masa dough 96 in central sleeve 40 and a cylinder of solid or frozen filling 99 is inserted through central opening 68 and, centered by tines 69, into the flowable masa dough 96. Filling can be frozen in a freezer by filling a tube, such as of plastic or metal, of desired dimensions with the filling. The flowable masa dough 96 displaced by filling 99 fills the remainder of central cavity 59. Upper assembly 60W is withdrawn and the flowable masa dough flows to fill in the voids left by tines 69 to leave a solid filling 99 surrounded by a tube of masa dough 96. The flowable masa dough 96 is preferably cooled by action of the frozen filling 99 to firm the masa dough 96 to form the tamale 95 of FIG. 2. Alternatively, the flowable masa dough 96 could be firmed by placing lower assembly 20 in a cooler.

Upon insertion of solid filling 99 into dough 96, dough 96 rises on inner face 50 of mold sleeve 40 and internal lip 54 blocks upward movement of side sheet 93 for retaining side sheet 93 in mold sleeve 40.

Lower end 57 of mold sleeve 40 includes means, such as internal lip 54B, projecting inward below inner face 50 for bearing against the bottom edge of side sheet 93 for blocking downward movement of side sheet 93 for retaining side sheet 93 in mold sleeve 40 when mold sleeve 40 is disconnected form base 30.

Tamale 95 is removed from lower assembly 20 in the manner described previously.

Having described the invention, it can be seen that it provides a very convenient device for efficient making of tamales 95 and for consistency in filling to masa ratio.

Although the invention has been described with respect to making tamales, it can be used for making other stuffed food items. Filling centering means 80, such as upper assembly 60F can form a filling-receiving cavity in any plastically deformable food, and, such as upper assembly 60W, can guide a solid or frozen filling into a flowable food Although a particular embodiment of the invention has been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. A device for molding dough for insertion of edible filling into the molded dough comprising:
    a lower assembly comprising:
        a plurality of separable elongate mold sleeve segments wherein each segment including an upper end and a lower end; said segments fitting together to form an elongate cylindrical mold sleeve having a longitudinal axis and encompassing a central cavity; said mold sleeve including:
            an inner face;
            an outer face;
            an upper end; and
            a lower end; and
        a base including:
            a top including:
                a surface; and
        retaining means for retaining said lower ends of said mold sleeve segments to said base so as to define a container for receiving the dough; and
    an upper assembly including:
        a disk for selectively covering said upper end of said mold sleeve; said disk having a center and a periphery;
        filling centering means projecting downward from said center of said disk for insertion into the dough in the central cavity for centering filling in the dough in said central cavity; and
        cooperating centering means projecting downward from said periphery of said disk and cooperating between said disk and said outer face of said mold sleeve of said lower assembly for centering said filing centering means in the central cavity of said mold sleeve during insertion of said filling centering means into the central cavity; said mold sleeve being separable into said mold sleeve segments for removing molded dough from said container; wherein said base further includes:
        a vent including:
            a vent orifice in said surface of said top; and
            a duct in said base providing ambient air to said vent orifice; and
    said filling centering means includes:
        a plunger connected to said disk and projecting downward therefrom and having a longitudinal axis, configured to form a central bore in the dough and including:
            an elongate plunger cylinder including:
                an upper end; and
                a lower end; and
            a punch on said lower end of said plunger cylinder; said cylinder being tapered from said upper end to said lower end to be more easily releasable from the dough upon withdrawal of said plunger from the dough and adapted for plunging into said upper end of said mold sleeve retained on said base so as to displace the dough received by said container and to displace a portion of the dough for receiving filling and wherein said punch enters said vent orifice such that ambient air can enter said central cavity below said plunger upon withdrawal of said plunger from said central cavity and such that a vacuum is not created upon withdrawal of said plunger and the dough is not pulled back into said central bore displaced by said plunger.

2. The device of claim 1 wherein:
said cooperating centering means holds said upper ends of said mold sleeve segments in the cylindrical mold sleeve configuration during insertion of said filling centering means into said central cavity.

3. The device of claim 1 wherein:
said upper assembly further includes:
a handle attached to said disk.

4. A device for receiving and molding dough for insertion of edible filling into the molded dough; the device being adapted for receiving a bottom release sheet and a side release sheet having a top end; said device comprising:
a lower assembly comprising:
  a plurality of separable elongate mold sleeve segments: each said segment including an upper end and a lower end; said segments fitting together to form an elongate cylindrical mold sleeve having a longitudinal axis and encompassing a central cavity; said mold sleeve including:
    an inner face for receiving the side release sheet;
    an outer face;
    an upper end including:
      an internal lip adapted for blocking upward movement of the side release sheet; and
      a lower end; and
  a base including:
    a top including:
      a surface for receiving the bottom release sheet; and
      retaining means for retaining said lower end of said mold sleeve segments to said base so as to define a container for receiving the dough; said container being lined with the bottom release sheet and side release sheet; and
an upper assembly including:
  a disk for selectively covering said upper end of said mold sleeve; said disk having a center and a periphery;
  filling centering means projecting downward from said center of said disk for insertion into the central cavity for centering filling in the dough in the central cavity; and
  cooperating centering means projecting downward from said periphery of said disk and cooperating between said disk and said outer face of said mold sleeve of said lower assembly for centering said filling centering means in the central cavity of said mold sleeve during insertion of said filling centering means into the central cavity; said mold sleeve being separable into said mold sleeve segments for removing molded dough from said container; wherein said base further includes:
    a vent including:
      a vent orifice in said surface of said top; and
      a duct in said base providing ambient air to said vent orifice; and
said filling centering means includes:
  a plunger having a longitudinal axis; said plunger connected to said disk and projecting downward therefrom and configured to form a central bore in the dough, said plunger including:
    an elongate plunger cylinder including:
      an upper end; and
      a lower end; and
      a punch on said lower end of said plunger cylinder;
said plunger cylinder being tapered from said upper end to said lower end to be more easily releasable from the dough upon withdrawal of said plunger from the dough and adapted for plunging into said upper end of said mold sleeve retained on said base so as to occupy a portion of the central cavity for receiving filling wherein said punch punches through the base sheet and enters said vent orifice such that ambient air can enter the central cavity below said plunger upon withdrawal of said plunger from the central cavity and such that a vacuum is not created upon withdrawal of said plunger and the dough is not pulled back into the central bore displaced by said plunger.

5. The device of claim 4 wherein:
said cooperating centering means holds said upper ends of said mold sleeves segments in the cylindrical mold sleeve configuration during insertion of said filling centering means into the central cavity.

6. The device of claim 4 wherein:
said cooperating centering means holds said upper ends of said mold sleeve segments in the cylindrical mold sleeve configuration during insertion of said filling centering means into the central cavity.

7. A device for receiving a bottom release sheet and dough and for molding the received dough for insertion of edible filling into the received dough; said device comprising:
a lower assembly comprising:
  an elongate cylindrical mold sleeve comprising a plurality of separable longitudinal mold sleeve segments fitting together to form an elongate cylindrical tube having a longitudinal axis and encompassing a central cavity; said mold sleeve including:
    an inner face;
    an outer face;
    an upper end; and
    a lower end; and
  a base including:
    a top including:
      an upper surface;
      a vent including:
        a vent orifice in said upper surface of said top; and
        a duct in said base providing ambient air to said vent orifice;
      and retaining means for retaining said lower end of said mold sleeve to said base so as to define a container for receiving dough; said container being lined with the bottom release sheet on said upper surface of said top of said base such that the bottom release sheet covers said vent orifice; and
an upper assembly including:
  a disk for selectively covering said upper end of said mold sleeve; said disk having a center and a periphery;
  a plunger projecting downward from said center of said disk and having a longitudinal axis, configured to form a central bore in the dough for receiving the edible filling, including:
    an elongate plunger cylinder including:
      an upper end; and
      a lower end including:
        a punch on said lower end of said plunger cylinder;
        said plunger cylinder being tapered from said upper end to said lower end to be more easily releasable from the dough upon withdrawal of said plunger cylinder from the dough and adapted for plunging into said upper end of said mold sleeve retained on said base so as to displace a portion of the dough received by said container to form the central bore for receiving filling and wherein said punch punches through the bottom release sheet and enters said vent orifice such that ambient air is able to enter the central cavity below said plunger upon withdrawal of said plunger from the central cavity and such that a vacuum is not created upon withdrawal of said plunger from the dough and the dough is not pulled back into the central bore displaced by said plunger and cooperating centering means projecting downward from said periphery of said disk and cooperating between said disk and said outer face of said mold sleeve of said lower assembly for centering said plunger cylinder in the central cavity of said mold sleeve during insertion of said plunger cylinder into the central cavity; said mold sleeve being separable into said mold sleeve segments for removing molded dough from said container.

8. The device of claim 7 wherein:

said cooperating centering means holds said upper ends of said sleeves in the cylindrical mold sleeve configuration during insertion of said filling centering means into the central cavity.

\* \* \* \* \*